US006927470B2

(12) United States Patent
Murari et al.

(10) Patent No.: US 6,927,470 B2
(45) Date of Patent: Aug. 9, 2005

(54) MICROMACHINED OSCILLATING ELEMENT, IN PARTICULAR A MIRROR FOR OPTICAL SWITCHES (75) Inventors: Bruno Murari, Monza (IT); Ubaldo Mastromatteo, Bareggio (IT); Paolo Ferrari, Gallarate (IT)

(73) Assignee: STMicroelectronics, S.r.l., Milan (IT)

( * ) Notice: Subject to any disclaimer, the term of this patent is extended or adjusted under 35 U.S.C. 154(b) by 41 days.

(21) Appl. No.: 10/606,660

(22) Filed: Jun. 25, 2003

(65) Prior Publication Data

US 2004/0056275 A1 Mar. 25, 2004

(30) Foreign Application Priority Data

Jun. 28, 2002 (IT) ..................................... TO2002A0565

(51) Int. Cl.[7] ......................................... H01L 31/0232
(52) U.S. Cl. ...................................... 257/432; 257/431
(58) Field of Search ............................... 257/432, 431, 257/434, 446, 444, 98, 435, 433

(56) References Cited

U.S. PATENT DOCUMENTS 6,330,102 B1   12/2001   Daneman et al.
6,624,003 B1 * 9/2003 Rice ........................... 438/106
6,629,461 B2 * 10/2003 Behin et al. ............. 73/514.16
6,713,367 B2 * 3/2004 Solgaard et al. ............ 438/459
6,744,173 B2 * 6/2004 Behin et al. ................ 310/309

* cited by examiner

Primary Examiner—David Nelms
Assistant Examiner—Thinh T Nguyen
(74) Attorney, Agent, or Firm—Graybeal Jackson Haley LLP (57) ABSTRACT A micromachined device made of semiconductor material is formed by: a semiconductor body; an intermediate layer set on top of the semiconductor body; and a substrate, set on top of the intermediate layer. A cavity extends in the intermediate layer and is delimited laterally by bottom fixed regions, at the top by the substrate, and at the bottom by the semiconductor body. The bottom fixed regions form fixed electrodes, which extend in the intermediate layer towards the inside of the cavity. An oscillating element is formed in the substrate above the cavity and is separated from top fixed regions through trenches, which extend throughout the thickness of the substrate. The oscillating element is formed by an oscillating platform set above the cavity, and by mobile electrodes, which extend towards the top fixed regions in a staggered way with respect to the fixed electrodes. The fixed electrodes and mobile electrodes are thus comb-fingered in plan view but formed on different levels.

22 Claims, 6 Drawing Sheets

MICROMACHINED OSCILLATING ELEMENT, IN PARTICULAR A MIRROR FOR OPTICAL SWITCHES

PRIORITY CLAIM

This application claims priority from Italian patent application No. TO2002A000565, filed Jun. 28, 2002, which is incorporated herein by reference.

TECHNICAL FIELD OF THE INVENTION

The present invention relates generally to a process for manufacturing a micromachined oscillating element, in particular a mirror for optical switches.

BACKGROUND OF THE INVENTION

As is known, in optical-fibre communication systems, in order to avoid conversion of optical signals into electronic signals and the subsequent conversion of electronic signals into optical signals, it is desirable to have miniaturized devices for addressing and switching optical signals. Advantageously, the addressing and switching devices must be activatable by electrical signals generated by electronics associated with the devices, which are preferably integrated.

To this aim, it has been proposed to manufacture small mobile reflecting surfaces (mirrors) employing microelectromechanical-machining technologies used for microelectromechanical devices (MEMs). In particular, the mirrors may have just one degree of freedom (they are able to rotate about just one axis) for making two-dimensional switches, or two degrees of freedom (they are able to rotate about two axes) for making three-dimensional switches. Different processes have been proposed for making optical-switching devices of the type referred to above; however, these processes are rather complex and present some limitations.

For example, EP-A-I 180 848 describes a process for manufacturing a switch, wherein the rotation of a mirror element is obtained by converting a translational motion generated by a linear actuator through a conversion assembly or joint arranged between the mirror element and the actuator.

A further process, implemented by the present applicant, enables the manufacture of a mirror element formed by a reflecting platform and a plurality of fingers (mobile electrodes), which are biased at a potential with respect to fixed electrodes so as to cause an attraction between some of the fixed electrodes and the mobile electrodes and hence a rotation of the mirror element. According to this process, the fixed electrodes are formed in a first wafer, the mirror element with the mobile electrodes are formed in a second wafer, bonded to the first wafer and appropriately thinned, and the portion of the first wafer underneath the platform is removed from the back after bonding the second wafer to a third temporary handling wafer.

The above process is disadvantageous in that, in addition to being on the whole rather complex, it involves etching of the silicon of the first wafer throughout its thickness with the purpose of freeing the mirror element. In addition, it entails the formation of openings in the second wafer for accessing the first wafer and appropriately biasing the fixed electrodes. This is disadvantageous in that the contacts to the fixed electrodes are at a different level from the contacts to the mobile electrodes and to other possible structures, thus creating problems in the testing step. In addition, the first wafer is all at a same potential (the potential of the stator), and this may create problems after assembly on a board if there are leakages.

SUMMARY OF THE INVENTION

An embodiment of the present invention improves the foregoing procedures so as to overcome the disadvantages.

According to this embodiment of the present invention there are provided a micromachined device and the relative manufacturing process.

BRIEF DESCRIPTION OF THE DRAWINGS

For an understanding of the present invention two preferred embodiments thereof are now described, purely by way of non-limiting example, with reference to the attached drawings, wherein.

DETAILED DESCRIPTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
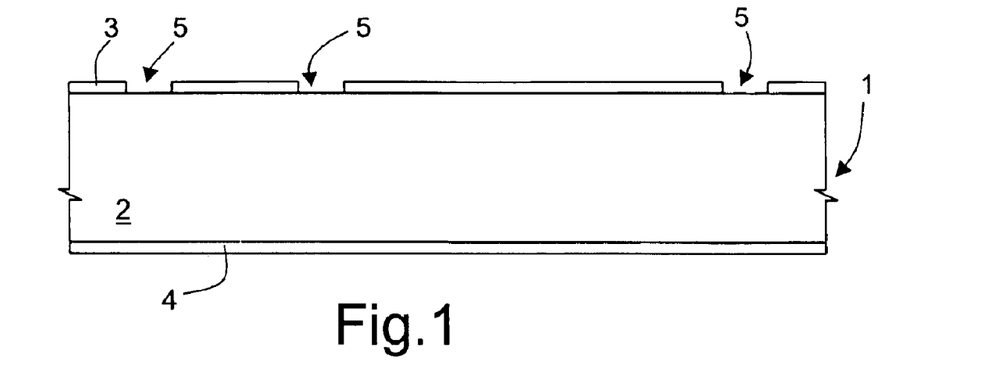
FIGS. 1–3 show a cross-section through a first wafer of semiconductor material, taken along line III—III of FIG. 4, in different fabrication steps.

According to FIG. 1, a first wafer 1 formed by a substrate 2 of monocrystalline semiconductor material (silicon) is subjected to oxidation, to form a first insulating layer 3 and a second insulating layer 4 of silicon dioxide, respectively on the front and on the rear of the wafer.

The first insulating layer 3 is then removed selectively to form contact openings 5 where the electrical contact is to be made between the substrate 2 and an intermediate layer, grown subsequently, as explained hereinafter. In particular, FIG. 1 shows three contact openings 5, at two stator regions and at an external region, as is better clarified hereinafter.

Figure 2:
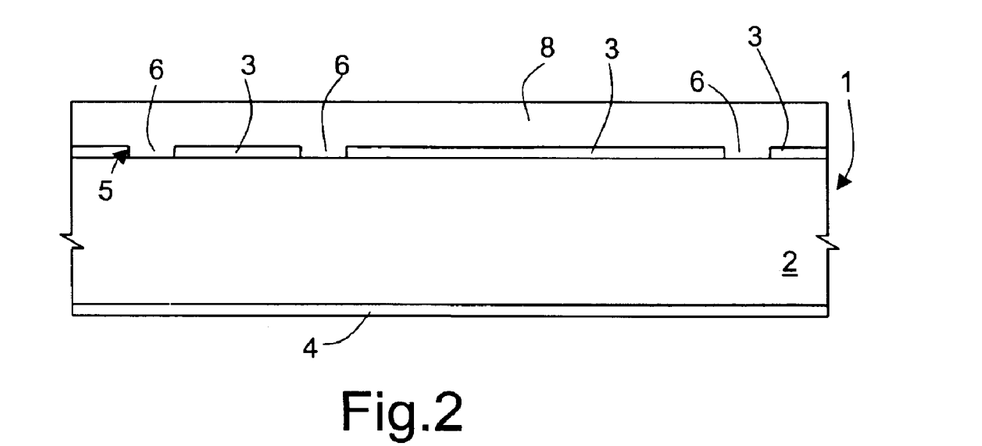

Subsequently, FIG. 2, on the front of the wafer 1, an intermediate layer 8 of polycrystalline silicon, obtained by deposition of an intermediate silicon layer or by deposition of a germ layer and subsequent epitaxial growth, is formed in a per se known manner. The intermediate layer 8 has, for example, a thickness of 50–100 µm and fills the contact openings 5 with contact portions 6, which thus electrically connect the intermediate layer 8 to the substrate 2. In a way not shown, on the back of the wafer 1 alignment marks are formed, necessary for the subsequent steps.

Figure 3:
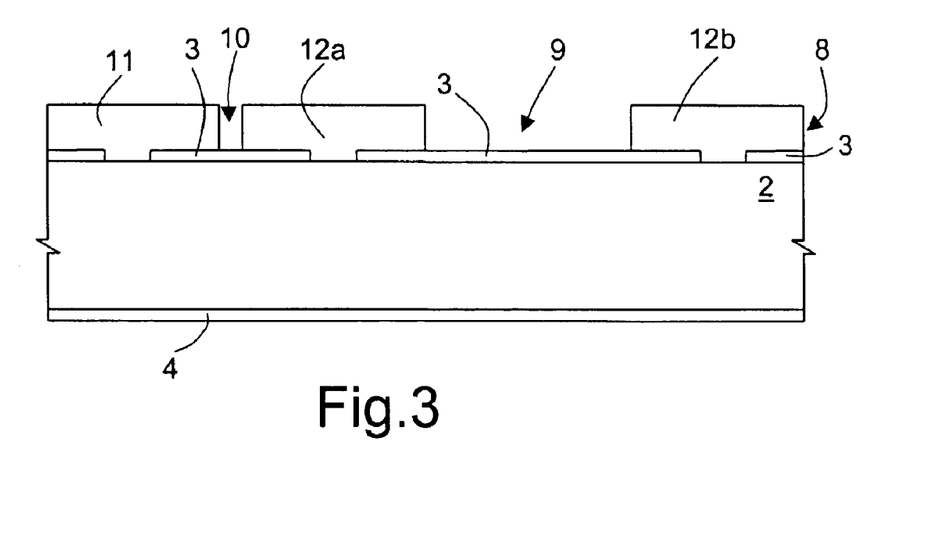
Figure 4:
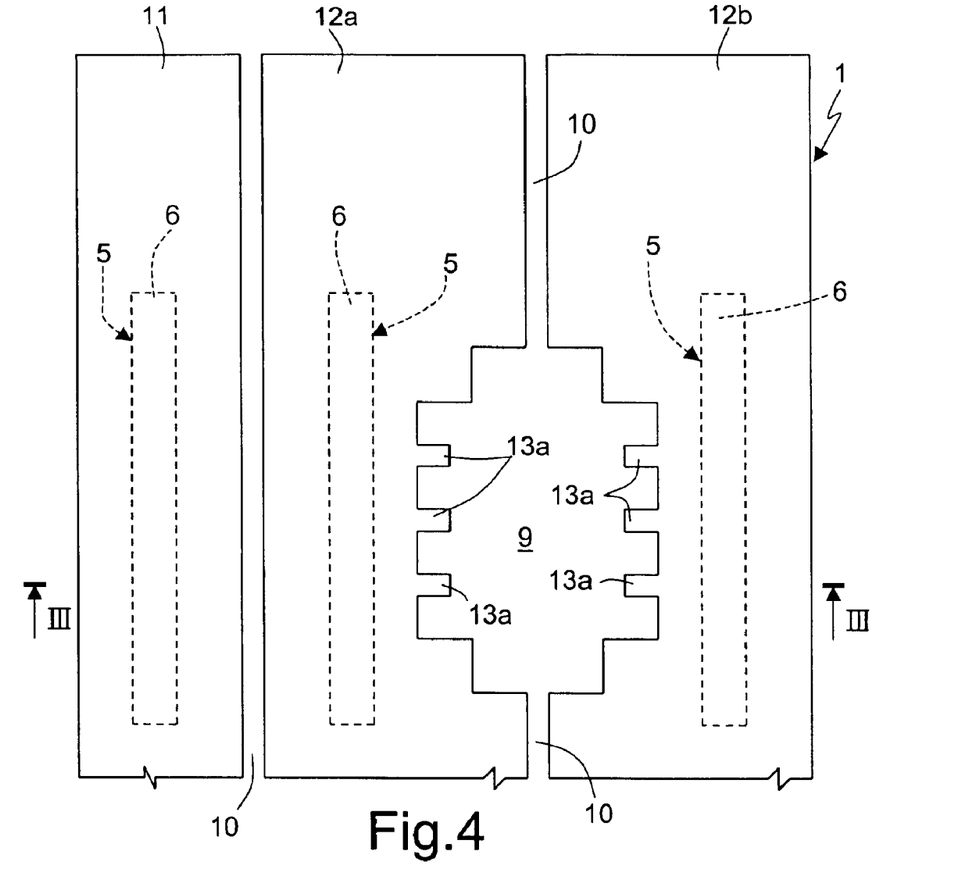
FIG. 4 is a top plan view of the wafer of FIG. 3.

After planarization through chemical-mechanical polishing (CMP), the wafer 1 is subjected (FIG. 3) to a masking and reactive ion etching (RIE) step, so as to form a cavity 9 and first electrical separation trenches 10. The shapes of the cavity 9 and of the first trenches 10 are shown in FIG. 4, which highlights with a dashed line also the shape of the contact portions 6. In this way, the intermediate layer 8 is here divided into a bottom outer region 11, a first bottom stator region 12a and a second bottom stator region 12b. Fixed electrodes 13a, 13b extend, respectively, from the first stator region 12a and from the second stator region 12b towards the inside of the cavity 9.

Figure 5:
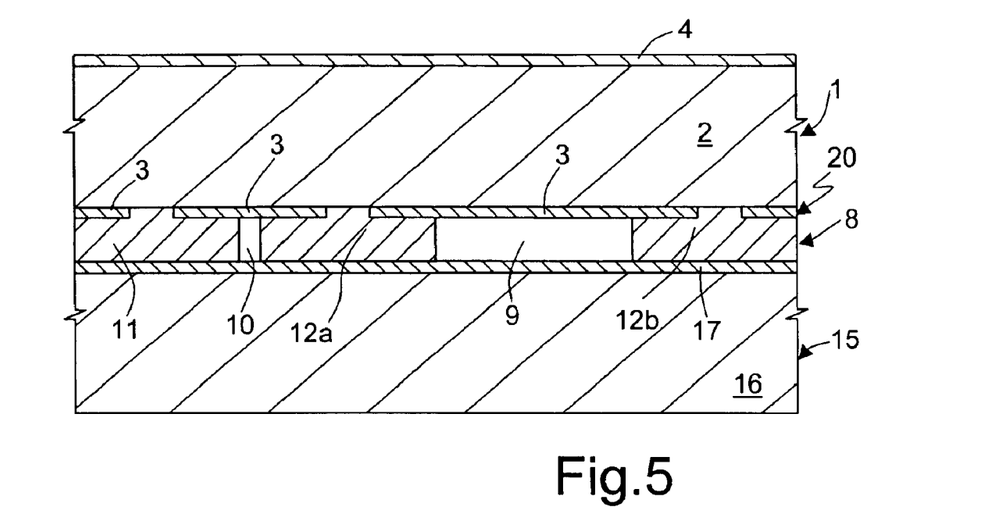
FIGS. 5–8 show a cross-section similar to that of FIGS. 1–3, after bonding the first wafer to a second wafer, in successive fabrication steps.

The first wafer 1 is turned upside down and bonded, in a per se known manner, to a second wafer 15 comprising a semiconductor body 16 and a bonding oxide layer 17, to obtain a composite wafer 20, as illustrated in FIG. 5.

Figure 6:
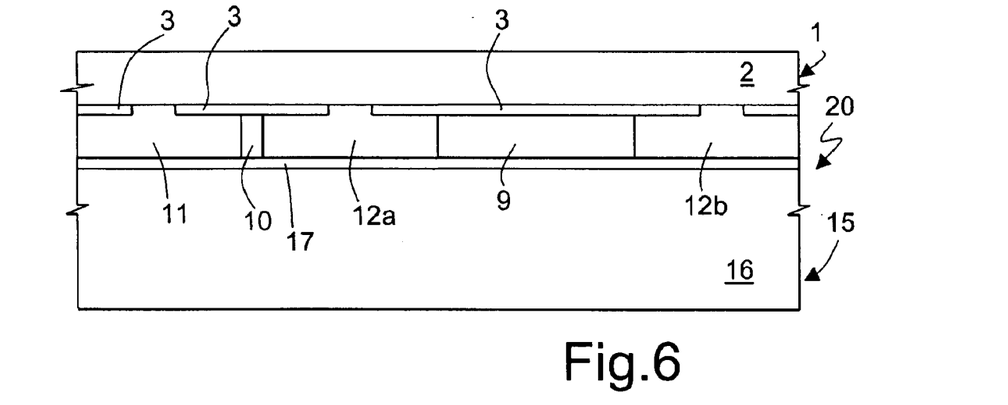

Hereinafter (FIG. 6), the first wafer 1 undergoes lapping and CMP so as to reduce the thickness of the substrate 2 to approximately 50–100 µm.

Figure 7:
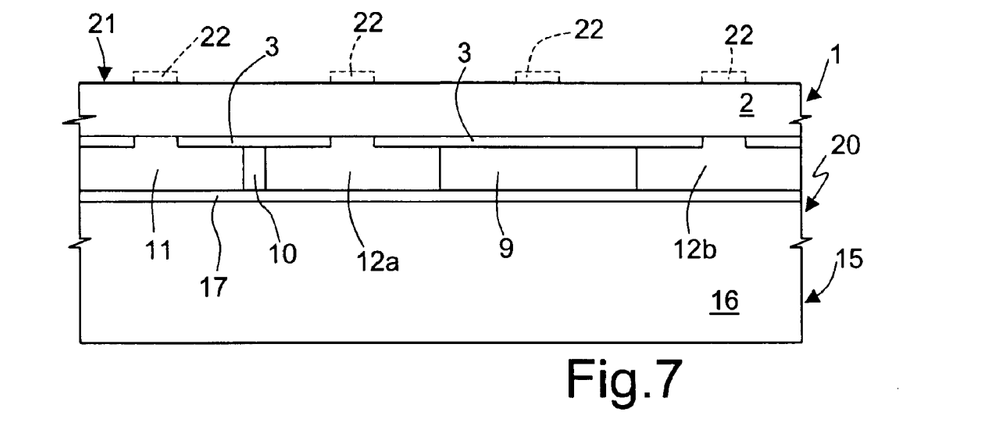

On the free surface 21 (FIG. 7), thus formed, of the first wafer 1 two metal layers, for example a first aluminium layer to form metallizations and a second chrome-gold layer to form a mirror surface (not shown), are then deposited and defined. In this way, metal contacts 22 (indicated with dashed lines in that they are arranged on a plane or planes different from the cross-sectional one) are formed, with the purpose of enabling biasing of the different portions of the finished device.

Figure 8:
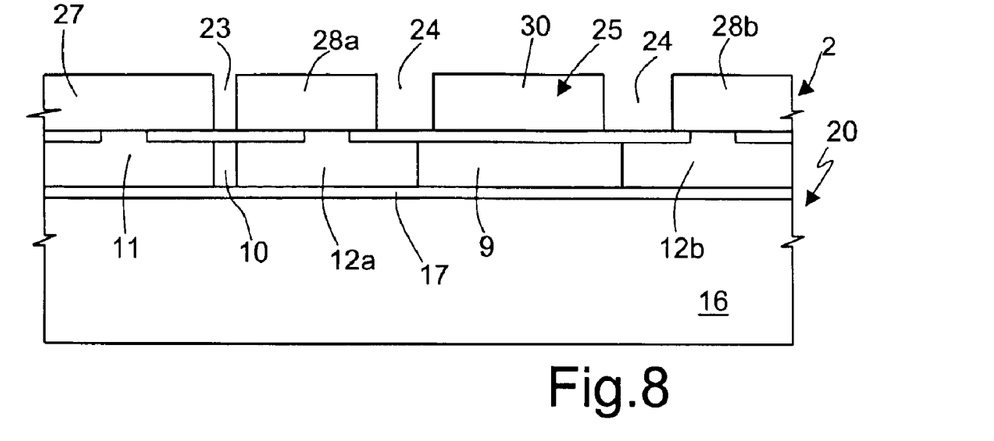
Figure 9:
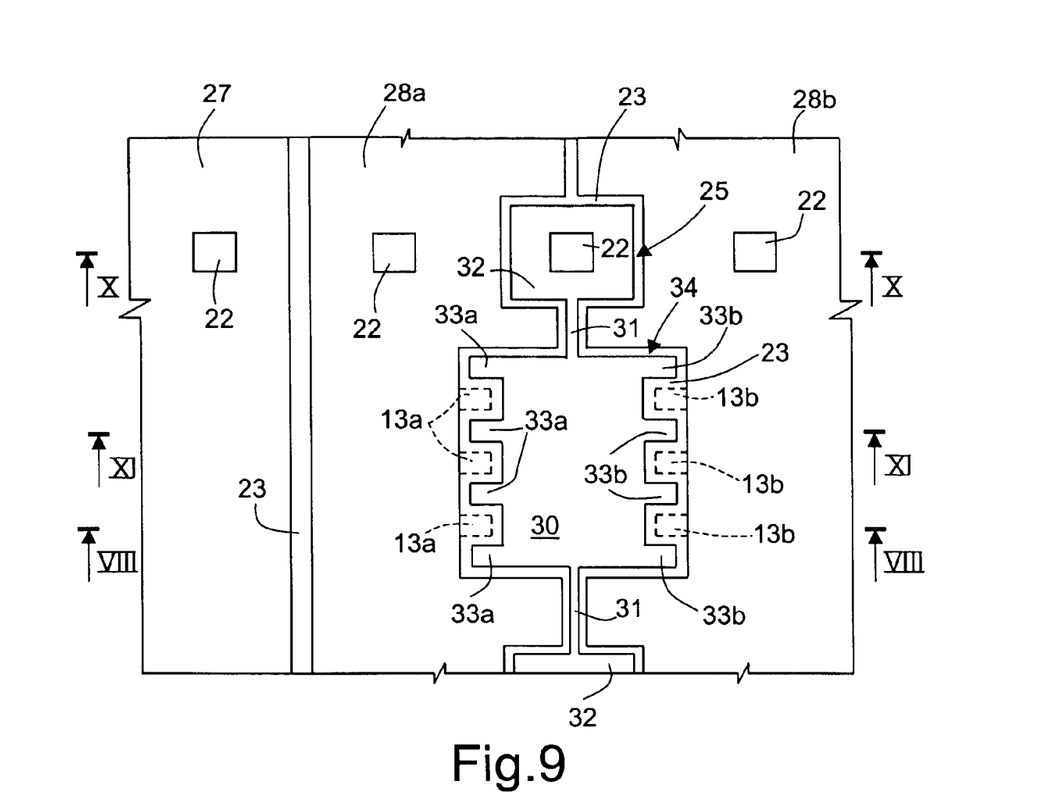
FIG. 9 is a top plan view of the composite wafer of FIG. 8.
Figure 10:
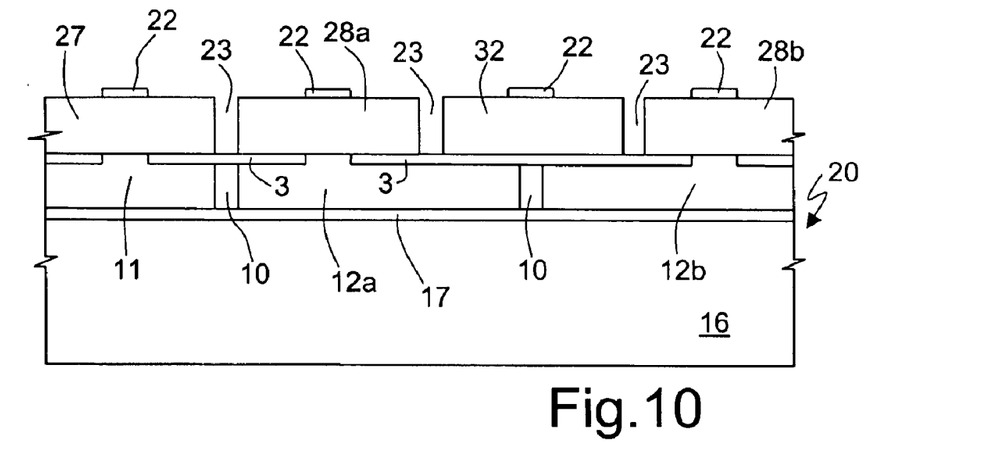
FIG. 10 is a cross-section of the composite wafer of FIG. 8, taken along the line X—X of FIG. 9.

Subsequently, in FIG. 8, the substrate 2 of the first wafer 1 is etched with a trench etch, which stops automatically on the first insulating layer 3. Second trenches 23, the shape whereof is shown in FIG. 9, are thus formed. The second trenches 23, which are in part aligned to the first trenches 10, separate from one another a mirror element 25, a top outer region 27, a top stator region 28a, and a second top stator region 28b. The mirror element 25 is formed by a platform 30, a pair of arms or supporting springs 31, anchoring regions 32, and mobile electrodes 33a, 33b; the platform 30, the supporting arms 31, and the mobile electrodes 33a, 33b extending above the cavity 9 and forming an oscillating element 34. The oscillating platform 30 forms a reflecting surface used for switching an optical beam. A metal contact 22 is present on at least one of the anchoring regions 32, as may be seen also from FIG. 10. In the example illustrated, the mobile electrodes 33a, 33b extend directly from the platform 30 toward the top stator regions 28a, 28b in a staggered way with respect to the fixed electrodes 13a, 13b and, precisely, combfingered with respect to the latter in top plan view, even though they are formed on different planes.

Finally, portions of the first insulating layer 3 are removed through the second trenches 23 by an RIE etch. In practice, the first insulating layer 3 is removed underneath the oscillating element 34, where the cavity 9 is present, so as to free the platform 30, the mobile electrodes 33a, 33b, and the supporting arms 31, as illustrated in the FIG. 11, which shows a cross-section taken on a plane different from that of the previous figures, and indicated by XI—XI in FIG. 9. In addition, the first insulating layer 23 is removed between the top outer region 27 and the first and second top stator regions 28a, 28b, separating completely said regions from one another.

Figure 11:
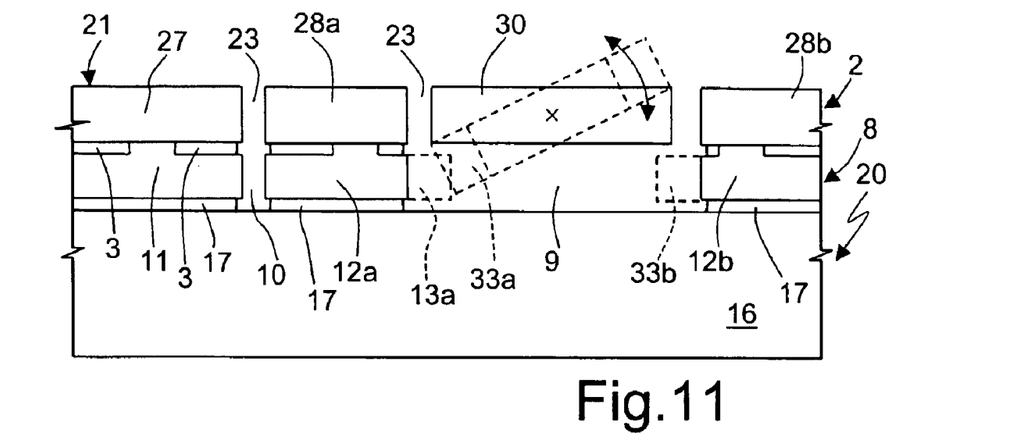
FIG. 11 shows a cross-section of the oscillating mirror element, taken along line XI—XI of FIG. 9, in a final fabrication step.
Figure 12:
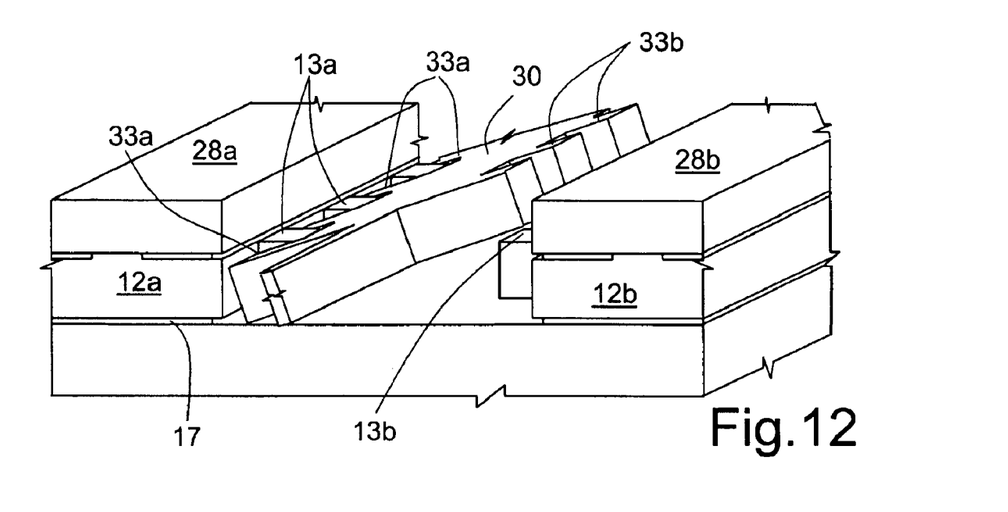
FIG. 12 is a perspective view of the mirror element of FIG. 11.

Thus the final structure of FIGS. 11 and 12 is obtained. In particular, in FIG. 11, the mirror element 25 is represented with a solid line in the resting position, with the platform 30 coplanar to the top stator regions 28a, 28b, and with a dashed line in the inclined position. The inclined position shown in FIGS. 11 and 12 is obtained by appropriately biasing the top stator regions 28a, 28b and the anchoring region 32 (through the metal contacts 22) so as to create an attractive force between the fixed electrodes 13a and the mobile electrodes 33a.

Figure 13:
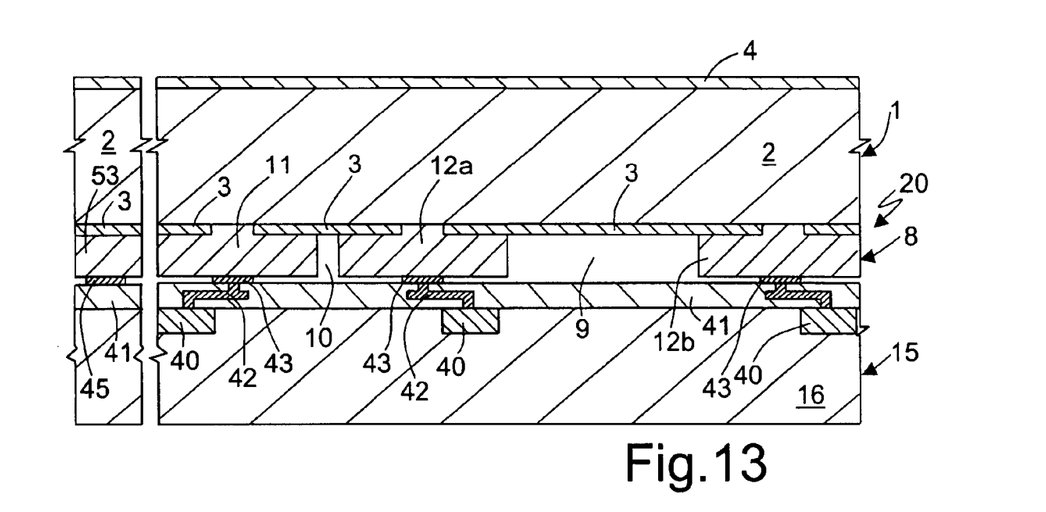
FIG. 13 illustrates a variant of FIG. 5.

According to a different embodiment of the process, the second wafer 15 houses the electrical components necessary for controlling the position of the platform 30. To this aim, the bonding between the first wafer 1 and the second wafer 15 must enable electrical connection between the bottom outer region 11 and the bottom stator regions 12a, 12b, and the relative components in the second wafer 15. In detail, as illustrated in FIG. 13 and in a per se known manner, the second wafer 15 is machined so as to integrate the electronic components, represented in FIG. 13 by conductive regions 40 having a conductivity opposite to the substrate 16. An oxide layer 41 is formed on top of the upper surface of the substrate 16, electrical-connection regions 42 of metal are formed inside the oxide layer 41, and pads 43, for example of palladium, are formed above the oxide layer 41, in regions 11, 12a, 12b of the first wafer 1. In addition, as shown in the portion to the left in FIG. 13, bonding regions 45 are formed, simultaneously to the pads 43, where a mechanical connection isdesired between the second wafer 15 and the first wafer 1.

Figure 14:
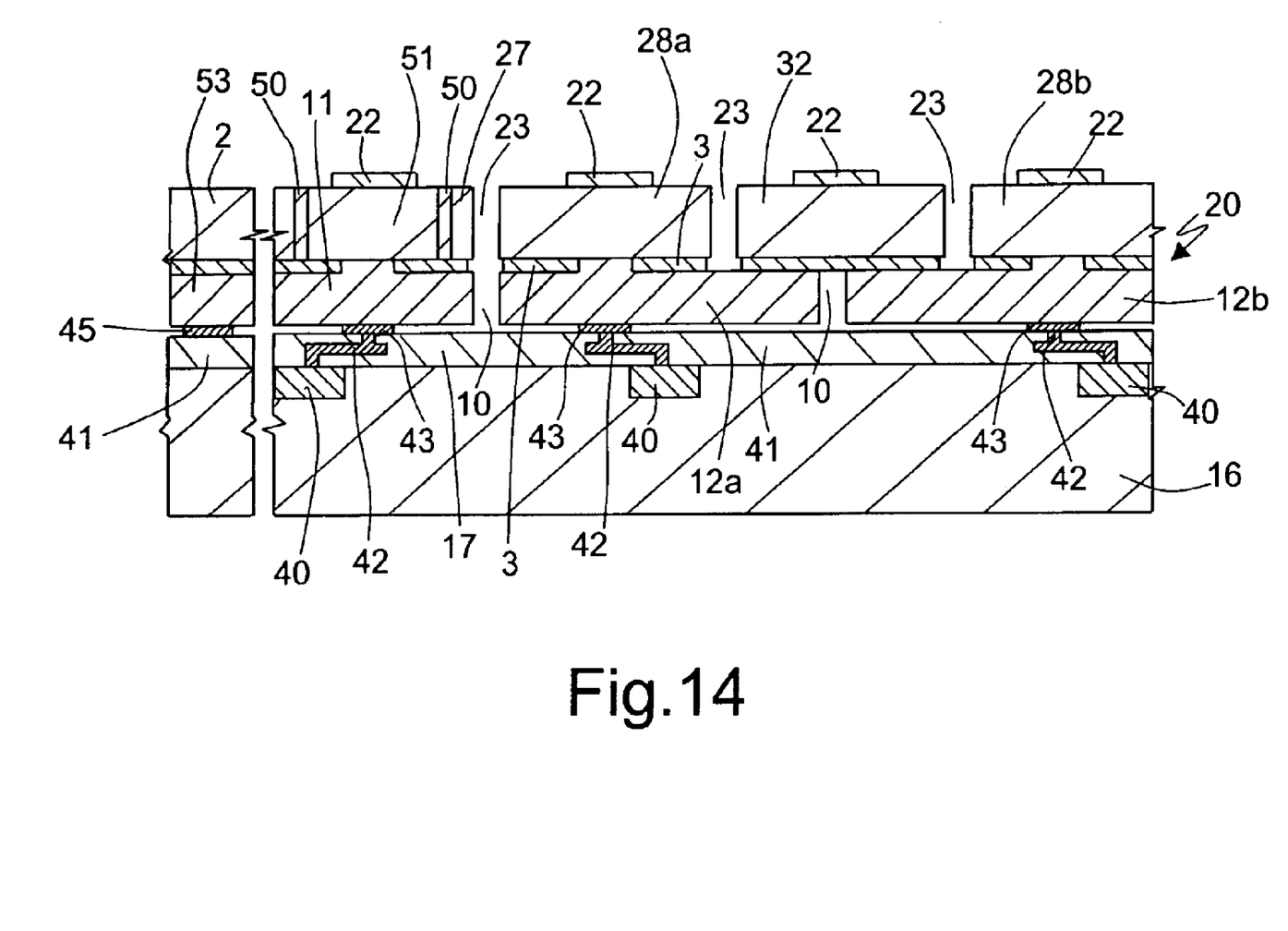
FIG. 14 is a cross-section of the variant of FIG. 13, in a final fabrication step.

Then, similar to what was described with reference to FIG. 5, the first wafer 1 is turned upside down and bonded to the second wafer 15. In particular, where the pads 43 and the bonding regions 45 are present, they form a bond with the silicon of the intermediate layer 8, electrically connecting the regions 11, 12a, 12b to the conductive regions 40 through the electrical-connection regions 42. In the bonding regions 45 there is, instead, a pure mechanical bonding. In addition, as may be noted in FIGS. 13 and 14, above the bonding regions 45 the first insulating layer 3 is continuous, insulating the portion 53 of the intermediate layer from the substrate 2. Then, the process proceeds with steps similar to the ones described with reference to FIGS. 6–12, except for that, when the second trenches 23 are made, circular openings are also formed around the pads 22 used for contacting the electronic components (conductive regions 40), and then these circular openings are filled with dielectric material 50 so as to insulate silicon plugs 51 from the rest of the substrate 2, as shown in FIG. 14.

The advantages of the described process and device are indicated hereinafter. First, the process is simple and involves the bonding of just two wafers to obtain the mirror element.

All the regions are electrically insulated from one another; in particular, the anchoring regions 32 of the mirror element 25 are insulated from the underlying regions by an oxide layer (first insulating layer 3) and the outer region 11, 27, the first stator region 12a, 28a, and the second stator region 12b, 28b are insulated from one another and with respect to the second wafer 15. This also enables integration of electronic components in the substrate 2, which is monocrystalline.

All the contacts are arranged at the same level, on the surface 21 of the substrate 2; consequently, the operations of contacting and testing are facilitated and it is possible to test the mirror element 25 in an electrical wafer sorting (EWS) step.

Freeing of the oscillating element 34 is obtained without the need to remove the underlying substrate from the backside; consequently, the procedure is simpler and more economical, and the final structure is sturdier.

The embodiments of micromachined devices described above with reference to FIGS. 1–14 may be incorporated into an integrated circuit, which may, in turn, be incorporated into an electronic system such as an optical communications system.

Finally, it is clear that numerous modifications and variations can be made to the process and device described and illustrated herein, all of which fall within the scope of the invention, as defined in the attached claims.

What is claimed is:

1. A micromachined device, characterized by:
a semiconductor body;
an intermediate layer on top of said semiconductor body;
a substrate of semiconductor material, on top of said intermediate layer;
a cavity extending in said intermediate layer, said cavity delimiting laterally bottom fixed regions and being delimited at the top by said substrate and at the bottom by said semiconductor body;
an oscillating element formed in said substrate above said cavity;
trenches extending through said substrate, said trenches insulating said oscillating element from top fixed regions;
said oscillating element comprising an oscillating platform and mobile electrodes extending towards said top fixed regions;
said bottom fixed regions forming fixed electrodes that extend in said intermediate layer towards the inside of said cavity and are staggered with respect to said mobile electrodes.

2. The device according to claim 1, further comprising a bonding structure, arranged between said semiconductor body and said intermediate layer.

3. The device according to claim 1, further comprising an insulating layer arranged between said intermediate layer and said substrate, electrical-connection regions extending through said insulating layer between said top fixed regions and said bottom fixed regions.

4. The device according to claim 3, wherein said substrate has a top surface, and wherein metal contacts are formed above said top surface in direct electrical contact with said top fixed regions and said oscillating element.

5. The device according to claim 1, wherein said oscillating element forms a mirror element of an optical switch further comprising a pair of anchoring regions and a pair of supporting arms extending between each anchoring region and said platform.

6. The device according to claim 5, wherein said mobile electrodes extend from said platform towards said top fixed regions.

7. The device according to claim 2, wherein said bonding structure is formed by an insulating material layer arranged between said semiconductor body and said intermediate layer.

8. The device according to claim 2, wherein said semiconductor body houses electronic components and is coated with an insulating material layer, and said bonding structure comprises electrically conductive regions arranged on top of said insulating material layer, said electrically conductive regions being in direct electrical contact with at least said bottom fixed regions and with electrical-connection regions formed in said insulating material layer for electrical connection between said electronic components and at least said bottom fixed regions.

9. A micromachined device, comprising:
a first substrate;
an intermediate layer adjacent the first substrate, the intermediate layer having first and second fixed control regions formed spaced apart from one another in the intermediate layer to define a cavity between the regions, each region having fixed control elements extending into the cavity along at least a portion of an edge defining the cavity;
a second substrate adjacent the intermediate layer, the second substrate including,
a movable element formed adjacent the cavity and having movable control elements extending into the cavity, the movable control elements being staggered relative to the fixed control elements, and
third and fourth fixed control regions formed separate from the movable element, the third and fourth fixed control regions being coupled to the first and second fixed control regions, respectively, in the intermediate layer.

10. The micromachined device of claim 9 wherein the movable element comprises:
an oscillating platform having mobile electrodes formed along a first edge that extend toward the third fixed control region and formed along a second edge that extend toward the fourth fixed control region; and
first and second arms formed along third and fourth edges of the platform; and
first and second anchor regions coupled to the first and second arms, respectively.

11. The micromachined device of claim 9 further comprising at least one metal contact formed on each of the third and fourth fixed control regions.

12. The micromachined device of claim 9 further comprising a bonding structure formed between the first substrate and the intermediate layer.

13. The micromachined device of claim 12 wherein the bonding structure comprises a bonding oxide layer.

14. The micromachined device of claim 12 wherein the bonding structure comprises:
an oxide layer formed on the first substrate; and
bonding regions formed on the oxide layer.

15. The micromachined device of claim 14 further comprising:
active regions formed in the first substrate, the active regions having an opposite conductivity type of a conductivity type of the first substrate; and
electrical contact regions formed in the oxide layer, each electrical contact region interconnecting a respective bonding region and active region.

16. An electronic system including a micromachined device, the micromachined device comprising:
a first substrate;
an intermediate layer adjacent the first substrate, the intermediate layer having first and second fixed control regions formed spaced apart from one another in the intermediate layer to define a cavity between the regions, each region having fixed control elements extending into the cavity along at least a portion of an edge defining the cavity;
a second substrate adjacent the intermediate layer, the second substrate including, a movable element formed adjacent the cavity and having movable control elements extending into the cavity, the movable control elements being staggered relative to the fixed control elements, and third and fourth fixed control regions formed separate from the oscillating element, the third and fourth fixed control regions being coupled to the first and second fixed control regions, respectively, in the intermediate layer.

17. The system of claim 16 wherein the system comprises an optical system.

18. A micromachined device, comprising:

a first substrate;

an intermediate layer adjacent the first substrate, the intermediate layer having fixed electrode regions formed in the layer with these electrode regions being spaced apart in the intermediate layer to define a cavity among the regions, the electrode regions including portions extending into the cavity; and a second substrate adjacent the intermediate layer, the second substrate including movable electrode regions formed in the second substrate, the movable electrode regions including portions extending into the cavity with the portions being offset relative to the portions of the fixed electrode regions.

19. The micromachined device of claim 18 wherein the first substrate bounds the cavity along a lower edge end wherein the second substrate bounds the cavity along an upper edge.

20. A device, comprising:

a first substrate;

an intermediate layer adjacent the first substrate, the intermediate layer having fixed electrodes formed in the layer with these electrodes being spaced apart in the intermediate layer to define a cavity among the electrodes; and a second substrate adjacent the intermediate layer, the second substrate including movable electrodes formed in the second substrate, wherein the movable electrodes are not positioned opposing the fixed electrodes in an at rest condition of the device.

21. The device of claim 20 wherein the fixed electrodes further comprise portions extending Into the cavity and wherein the movable electrodes further include portion extending into the cavity and being offset relative to the portions of the fixed electrode regions.

22. The device of claim 20 wherein the first substrate bounds the cavity along a lower edge and wherein the second substrate bounds the cavity along an upper edge.

* * * * *